(12) United States Patent
Marra

(10) Patent No.: US 8,485,787 B2
(45) Date of Patent: Jul. 16, 2013

(54) TURBINE AIRFOIL FABRICATED FROM TAPERED EXTRUSIONS

(75) Inventor: John J. Marra, Winter Springs, FL (US)

(73) Assignee: Siemens Energy, Inc., Orlando, FL (US)

(*) Notice: Subject to any disclaimer, the term of this patent is extended or adjusted under 35 U.S.C. 154(b) by 821 days.

(21) Appl. No.: 12/555,096

(22) Filed: Sep. 8, 2009

(65) Prior Publication Data

US 2011/0058949 A1 Mar. 10, 2011

(51) Int. Cl.
*F01D 5/14* (2006.01)
(52) U.S. Cl.
USPC .......................... 416/233; 29/889.72
(58) Field of Classification Search
USPC .............. 416/232, 233; 29/889.21, 889.71, 29/889.72, 889.721
See application file for complete search history.

(56) References Cited

U.S. PATENT DOCUMENTS

| | | | |
|---|---|---|---|
| 2,365,482 A | 12/1944 | Manken et al. | |
| 2,451,454 A | 10/1948 | Wetter | |
| 2,506,244 A | 5/1950 | Stopka | |
| 3,097,982 A | 7/1963 | Stoner | |
| 3,623,204 A * | 11/1971 | Wagle | 228/182 |
| 4,814,029 A | 3/1989 | Butcher | |
| 5,176,499 A | 1/1993 | Damlis et al. | |
| 5,240,376 A | 8/1993 | Velicki | |
| 5,384,959 A | 1/1995 | Velicki | |
| 5,499,904 A | 3/1996 | Wallace et al. | |
| 5,941,446 A | 8/1999 | Yasui | |
| 5,989,466 A | 11/1999 | Kato et al. | |
| 6,431,837 B1 | 8/2002 | Velicki | |
| 6,478,535 B1 | 11/2002 | Chung et al. | |
| 6,746,755 B2 | 6/2004 | Morrison et al. | |
| 7,458,799 B2 | 12/2008 | DeFreitas | |
| 2007/0240307 A1 * | 10/2007 | Deron et al. | 29/889.2 |

* cited by examiner

*Primary Examiner* — Dwayne J White

(57) ABSTRACT

An airfoil (30) and fabrication process for turbine blades with cooling channels (26). Tapered tubes (32A-32D) are bonded together in a parallel sequence, forming a leading edge (21), a trailing edge (22), and pressure and suction side walls (23, 24) connected by internal ribs (25). The tapered tubes may be extruded without camber to simplify the extrusion process, then bonded along matching surfaces (34), forming a non-cambered airfoil (28), which may be cambered in a hot forming process and cut (48) to length. The tubes may have tapered walls that are thinner at the blade tip (T1) than at the base (T2), reducing mass. A cap (50) may be attached to the blade tip. A mounting lug (58) may be forged (60) on the airfoil base and then machined, completing the blade for mounting in a turbine rotor disk.

20 Claims, 6 Drawing Sheets

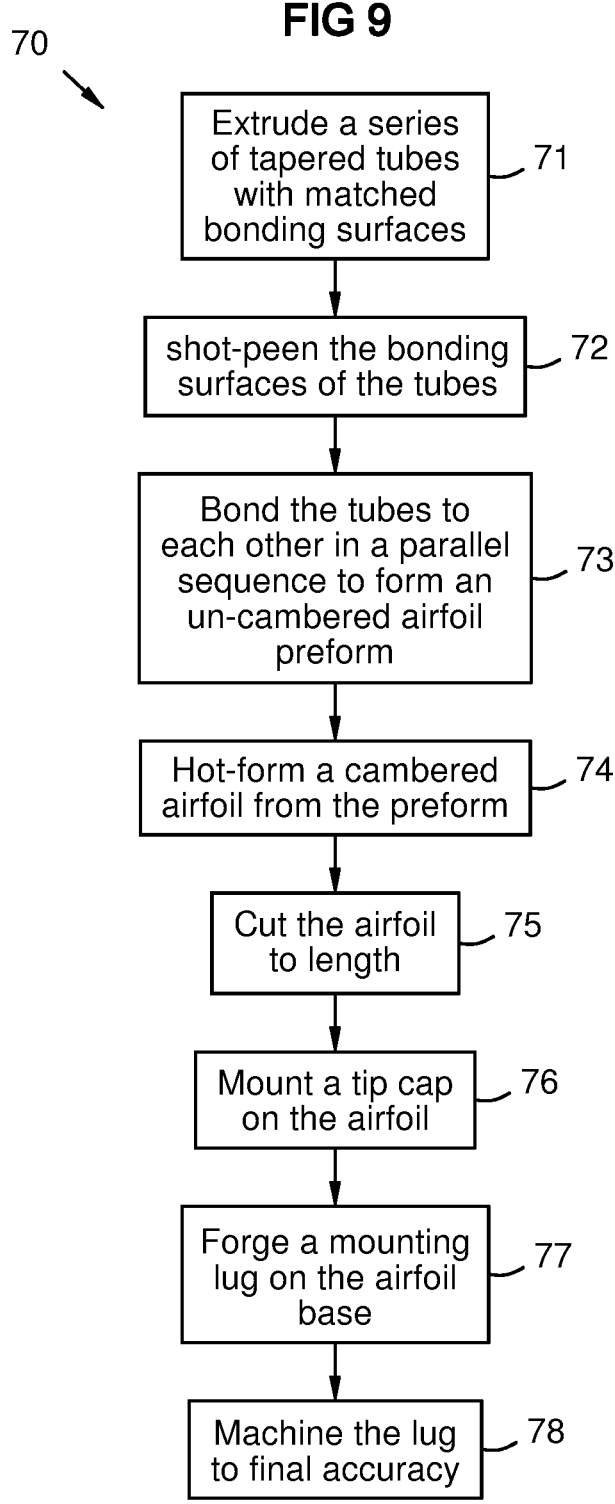

US 8,485,787 B2

TURBINE AIRFOIL FABRICATED FROM TAPERED EXTRUSIONS

STATEMENT REGARDING FEDERALLY SPONSORED DEVELOPMENT

Development for this invention was supported in part by Contract No. DE-FC26-05NT42644, awarded by the United States Department of Energy. Accordingly, the United States Government may have certain rights in this invention.

FIELD OF THE INVENTION

This invention relates to fabrication of turbine blades with cooling channels.

BACKGROUND OF THE INVENTION

Gas turbine engines for power plants are being developed with larger gas flow areas for improved efficiencies, thereby requiring larger turbine blades than in previous designs. A high working gas temperature also increases efficiency. When a large blade size is combined with high rotational speed and high temperature, the resultant loading on a blade and its attachment slot in the turbine rotor disk can be very high. Centrifugal force increases with blade mass and length. These factors also increase potential vibration problems. A part-span snubber or tip shroud can reduce vibration, but these devices become problematic with increased blade size.

Blade mass and temperature have been reduced in smaller cast blades by incorporating cored passages for cooling and weight reduction. Such blades have load-bearing airfoil walls, in which the cumulative centrifugal loading of the blade is carried radially inward toward the blade root via the outermost wall. The terms "radial" or "radially" as used herein means relative to the rotation axis of the turbine rotor or disk, generally along a line connecting the tip and the base of the airfoil. The wall thickness at the blade tip affects the thickness required at the root to carry the resultant load from the rotating mass. The minimum practical wall thickness is determined by casting tolerances, and the resulting centrifugal loadings are a limiting factor in designing very large blades for new engine designs.

BRIEF DESCRIPTION OF THE DRAWINGS

The invention is explained in the following description in view of the drawings that show:

FIG. 9 is a flow chart of a method of aspects of the invention.

DETAILED DESCRIPTION OF THE INVENTION

Figure 1:
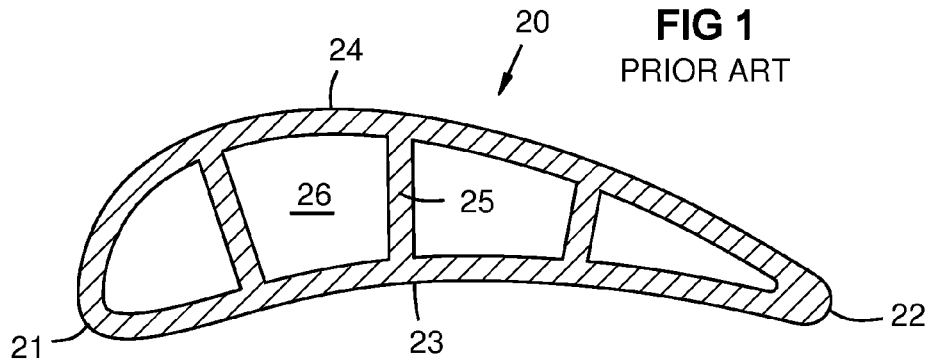
FIG. 1 is a sectional view of an existing cast turbine blade design.

FIG. 1 shows a sectional view of a known cast turbine blade design 20, which can be described as a hollow multi-cellular structure with a leading edge 21, a trailing edge 22, and pressure 23 and suction 24 side walls connected via internal ribs 25. Internal radially oriented channels 26 are used to carry cooling flows within the blade as known in the art.

Figure 2:
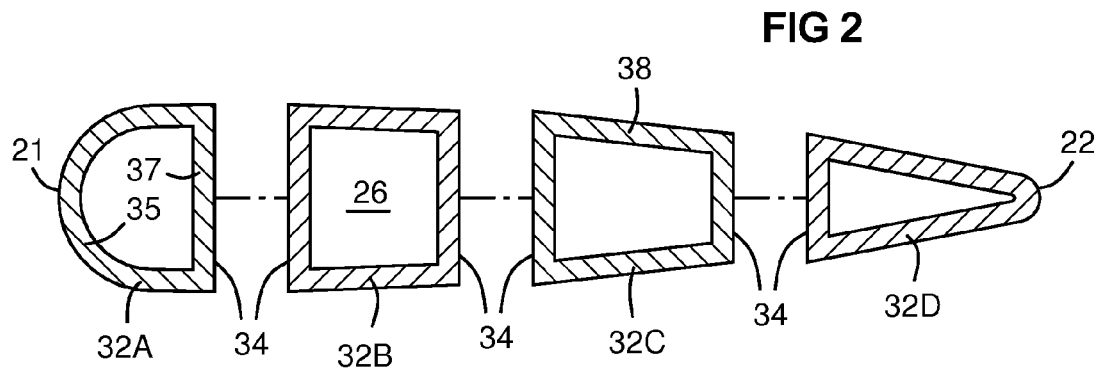
FIG. 2 is a sectional exploded view of a sequence of generally non-circular tubes used to form an airfoil.

FIG. 2 shows a sectional view of extruded tubes 32A-32D to be bonded together along respective bonding surfaces 34 to form an airfoil with a leading edge 21 and a trailing edge 22. The tubes have differing cross sections depending on their location. The leading edge tube 32A may have a D-shaped cross section with a semicircular wall 35 and a flat wall 37 as shown. Intermediate tubes 32B-32C may have rectangular or trapezoidal sectional shapes. The trailing edge tube 32D may have a generally triangular sectional shape as illustrated, an apex of which defines the trailing edge 22. The extrusions may have straight walls 38 without camber to simplify the extrusion equipment and processes to produce accurately matched bonding surfaces 34.

Figure 3:
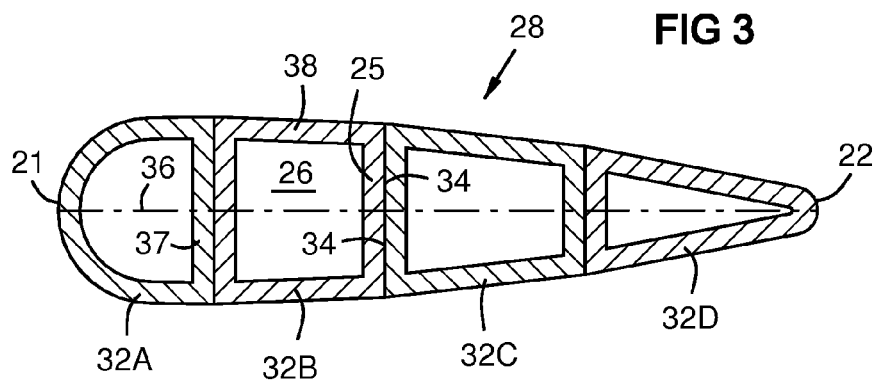
FIG. 3 is a sectional view of a flat preform of a non-cambered airfoil formed by bonding the tubes of FIG. 2 to each other.

FIG. 3 is a sectional view of a flat preform 28 of a non-cambered airfoil formed by bonding the tubes of FIG. 2 to each other. The tubes 32A-32D may have an axis 36 of bilateral symmetry to simplify the extrusion equipment. The extrusion walls forming the bonding surfaces 34 may be thinner (not shown) than the extrusion walls 38 forming the outer wall 23, 24 of the airfoil so that the internal ribs 25 are less than twice the thickness of the outer walls.

Figure 4:
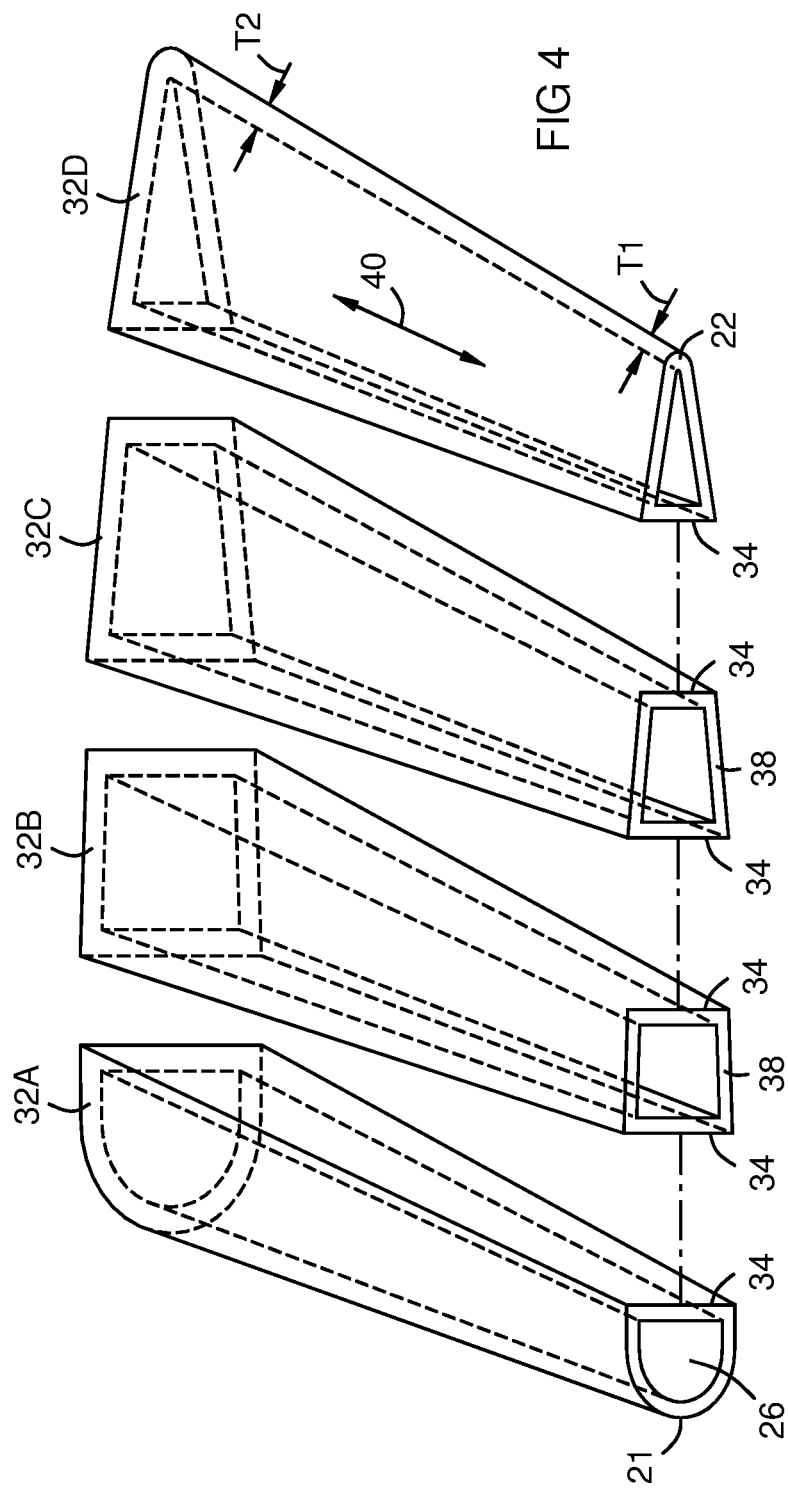
FIG. 4 is a perspective view of a sequence of tapered tubes with tapered walls.

FIG. 4 shows tapered tubes 32A-32D with walls that are tapered from a thinner wall thickness T1 at the tip end to a thicker wall thickness T2 at the base end of the airfoil. Wall tapering helps minimize mass at the blade tip while maintaining strength where needed near the blade root end. The use of an extrusion process for this application enables the manufacturing of thinner walls at the tip of the blade than is currently possible with the prior art casting processes. Another advantage is that extrusion works the metal and produces a metal grain orientation in the desirable radial (longitudinal) direction 40 of the blade. Exemplary extrusion materials for this invention are superalloys such as Haynes 230, Haynes 282, or others known in the art.

Tapered tubular extrusions can be made with known extrusion technology. Flag poles and street lamp poles are commonly made by a tapered metal extrusion process. The extrusion die has a continuously variable exit orifice formed by a periphery of tapered cams that define the perimeter. As the extrusion progresses, the cams rotate, thus varying the outer dimensions of the extrusion. A tapered mandrel moves axially within the orifice in coordination with the cams to determine the inner dimensions of the extrusion and the wall thickness. A backward or indirect extrusion process may be especially suitable for the present invention, in which the billet and container move together while the die is stationary.

Figure 5:
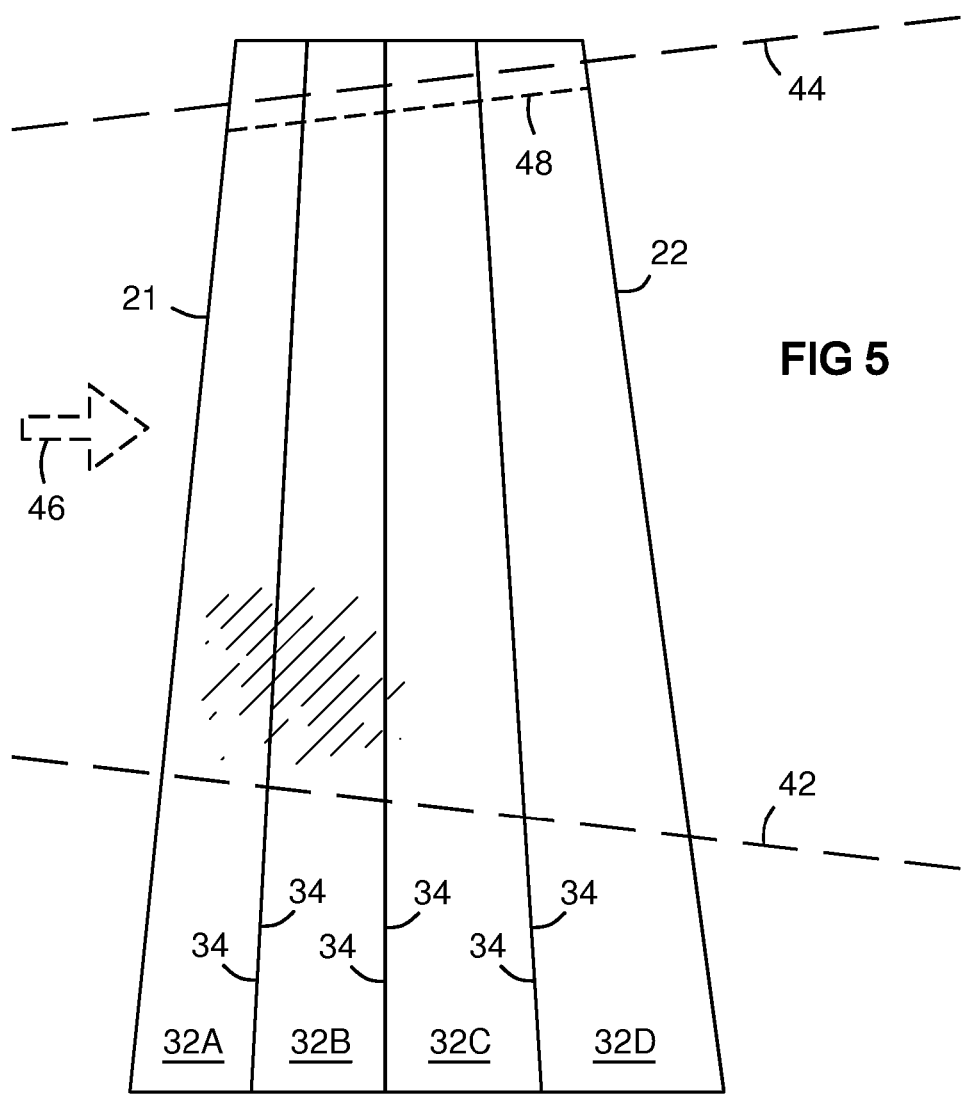
FIG. 5 is a side view of the tubes of FIG. 4 bonded together.

FIG. 5 shows a side view of the tubes 32A-32D bonded together along their bonding surfaces 34. Bonding can be done by known processes such as, for example, diffusion bonding, transient liquid phase bonding, or brazing to form a flat preform of a non-cambered airfoil shape. Prior to bonding, shot-peening of the bonding surfaces 34 may be done to produce a residual compressive stress that promotes re-crystallization during subsequent solution heat treating. Bonding along the inner surfaces 34 puts the bonds in regions of the airfoil that are exposed to lower temperatures during operation of the airfoil in a gas turbine engine when compared to bonds were made at the outer wall. When bonding is complete, a cellular structure has been formed. For reference, an inner shroud diameter 42 and outer shroud diameter 44 of the envelope or path of the working gas flow 46 are shown. A cut line 48 is shown for cutting the tip of the airfoil with enough clearance to receive a tip cap as discussed below.

Figure 6:
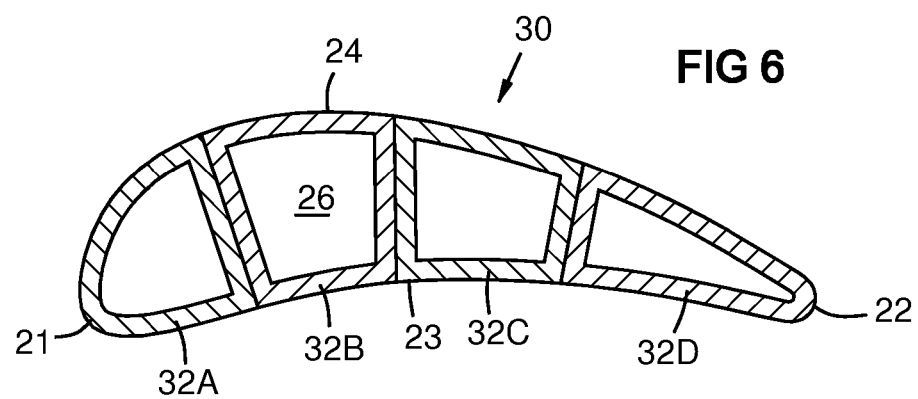
FIG. 6 is a sectional view of a cambered airfoil formed from the non-cambered airfoil of FIG. 3 by a hot forming process.

FIG. 6 shows a sectional view of a turbine blade 30 formed by bonding the tubes 32A-32D together to form a non-cambered airfoil, then hot die forming or super-plastic forming the airfoil to a final cambered shape. Such forming processes are known in the art of gas turbine component fabrication, for example in forming curved transition panels.

Figure 7:
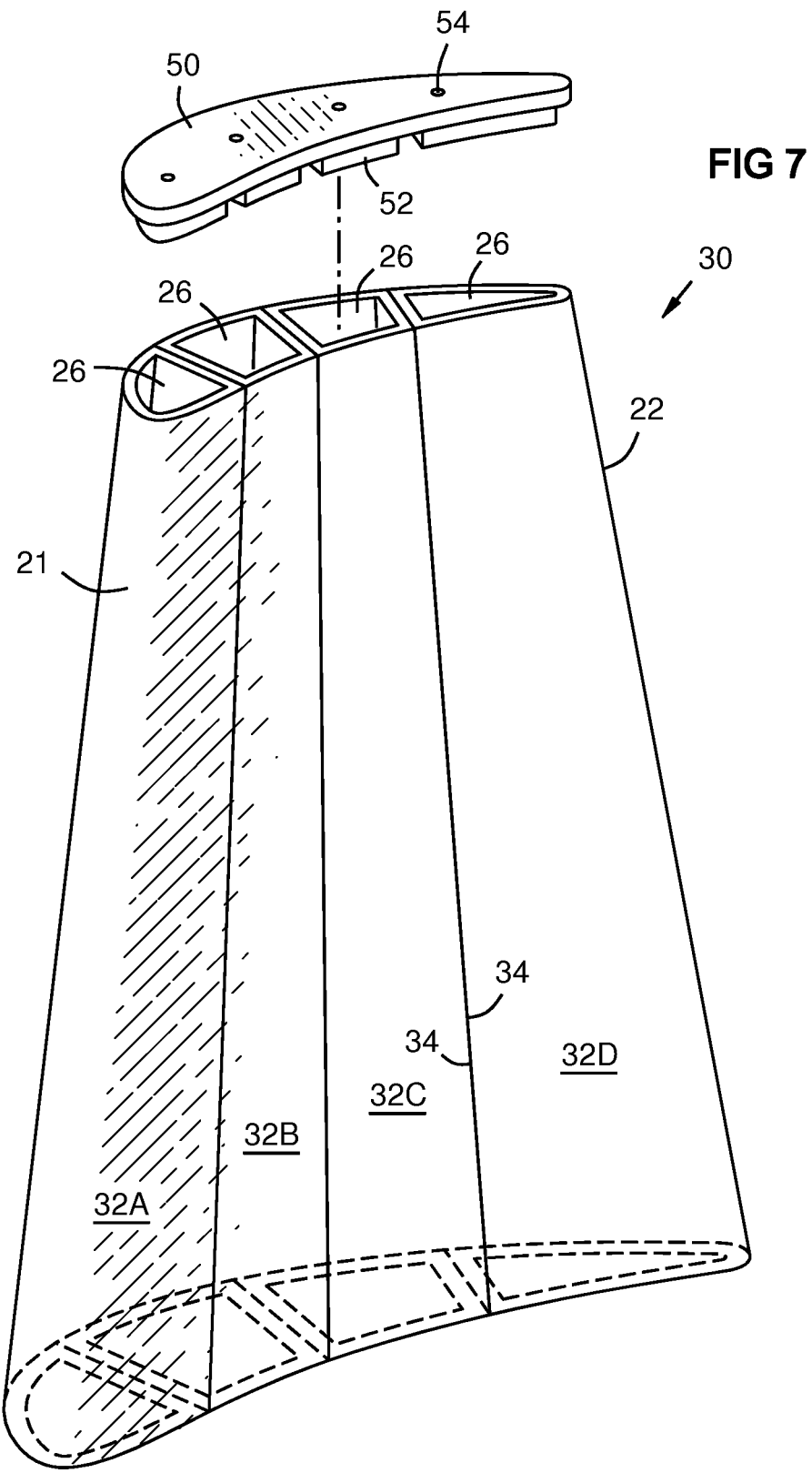
FIG. 7 is a perspective view of a cellular airfoil receiving a tip cap.

FIG. 7 shows a turbine blade 30 receiving a tip cap 50 with portions 52 that extend into the cooling channels 26. This cap may be attached by diffusion bonding, transient liquid phase bonding, or brazing. It may have coolant exit holes 54 as known in the art and/or it may have 180-degree channel turns (not shown) to route coolant from one channel 26 to an adjacent channel 26 for a closed cooling circuit. The tip cap 50 may be cast for example from a nickel-based super-alloy as known in the art.

Figure 8:
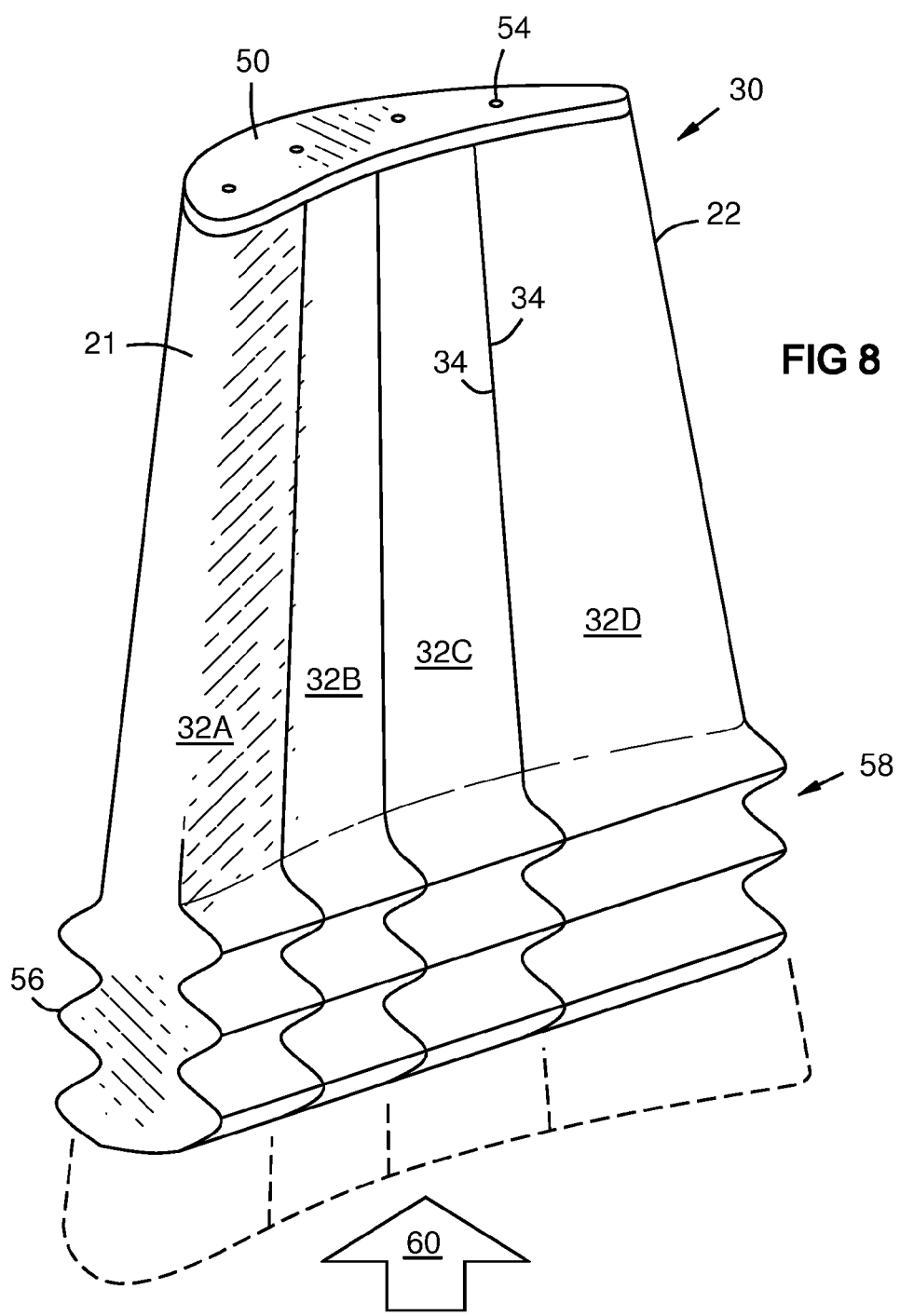
FIG. 8 is a perspective view of the airfoil of FIG. 7 with a fir tree mounting lug on the base formed by upset forging.

FIG. 8 shows a series of one or more laterally extending ridges 56 forming what is known as a "fir tree" root on the base of the airfoil to serve as a mounting lug 58 that is slidable into a matching slot in the perimeter of a turbine rotor disk as known in the art. This lug may be formed by upset forging 60 to create a semi-finished fir tree geometry, followed by machining for final accuracy. Upset forging is a known process that increases the width of a workpiece by compressing its length. Mandrels may be placed in the channels during forging to prevent inward buckling of the walls, and to maintain the channels through the base. The above method produces a mounting lug 58 that is integral with the airfoil 30. The cooling channels 26 open at the bottom or radially inner end of the lug to receive a coolant such as compressed air via channels in the rotor disk as known in the art.

FIG. 9 shows a flow chart of a fabrication method 70 according to aspects of the invention, including the steps of:
    71—Extrude a series of tapered tubes with matched bonding surfaces;
    72—Optionally shot-peen the bonding surfaces of the tubes;
    73—Bond the tube to each other in a parallel sequence to form a non-cambered airfoil preform;
    74—Hot-form a cambered airfoil from the preform;
    75—Cut the airfoil to length;
    76—Mount a tip cap on the airfoil;
    77—Forge a mounting lug on the airfoil base; and
    78—Machine the lug to final accuracy.
It will be appreciated that the order of some steps may be changed for various embodiments, for example step 77 may be completed prior to step 76.

The airfoil structure and process herein may be useful for any airfoil in any type of turbine engine or compressor. However, it is especially useful for turbine blades greater than 3100 mm (120 inches) in length, operating in temperatures of 650-900 degrees Centigrade (1200-1650 degrees Fahrenheit), such as the row-four turbine blades in an industrial hydrogen turbine being developed for the U.S. Department of Energy. Such blades are hot enough to require cooling flow, and large enough to present unique challenges not adequately solved by current fabrication practices. The present invention offers reductions in centrifugal loading greater than are possible with existing cast turbine blades.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A turbine airfoil comprising:
    a plurality of tapered tubes bonded together in a parallel sequence such that an outer surface of the tubes is an outer surface of an airfoil, the outer surface of a first of the tubes is a leading edge, and the outer surface of a last of the tubes is a trailing edge;
    wherein walls of the tubes form pressure and suction side walls of the airfoil and internal ribs there between; and
    wherein the tapered tubes comprise outer dimensions that taper from relatively smaller at a tip end of the airfoil to relatively larger at a base end of the airfoil, and the walls of the tubes taper from thinner at the tip end of the airfoil to thicker at the base end of the airfoil.

2. The airfoil of claim 1, further comprising a mounting lug comprising at least one pair of opposed laterally extending ridges integrally formed on the base end of the airfoil.

3. The airfoil of claim 1, wherein each tube comprises a metal grain orientation in a radial direction of the airfoil created by an extrusion process used to form the tubes.

4. The airfoil of claim 1, wherein the tapered tubes are formed without curvature for airfoil camber; wherein the tapered tubes are banded to each other to form a flat preform of a non-cambered airfoil; and wherein the preform is hot-formed into a cambered airfoil.

5. The airfoil of claim 1, further comprising a mounting lug formed by at least one pair of opposed laterally extending ridges on the base end.

6. The airfoil of claim 1, wherein the first of the tubes has a D-shaped cross section with a semi-circular wall that is the leading edge and a flat wall; and wherein the last of the tubes has a generally triangular cross section with an apex that defines the trailing edge.

7. A method of fabricating a turbine airfoil, comprising:
    forming a plurality of tapered tubes, each tube comprising a smaller end and a larger end, and comprising walls that are thinner at the smaller end than at the larger end; and
    bonding the tapered tubes to each other in a parallel sequence such that an outer surface of the tapered tubes is an outer surface of an airfoil comprising a leading edge, a trailing edge, side walls connected by internal ribs, a tip end of the airfoil, and a base end of the airfoil that is larger than the tip end.

8. The method of claim 7, further comprising forming the tapered tubes of a superalloy material using a tapered extrusion process.

9. The method of claim 7, further comprising:
    forming a first of the tubes with a curved wall and a flat wall, the curved wall forming the leading edge of the airfoil; and
    forming a last of the tubes with a generally triangular cross section, an apex of which defines a trailing edge of the airfoil.

10. The method of claim 7, further comprising shot-peening bonding surfaces of the tubes prior to bonding the tubes to each other along the bonding surfaces.

11. The method of claim 7, further comprising bonding the tubes to each other by diffusion bonding, transient liquid phase bonding, or brazing.

12. The method of claim 7, further comprising creating a metal grain orientation in a radial direction of the airfoil by forming the tubes using an extrusion process.

13. A method of fabricating a turbine airfoil, comprising:
extruding a series of tapered tubes with respectively matched bonding surfaces;
bonding the tubes to each other in a parallel sequence to form a non-cambered airfoil preform;
hot-forming a cambered airfoil from the preform;
cutting the airfoil to a particular length;
mounting a tip cap on the airfoil;
upset forging a mounting lug on a base end of the cambered airfoil; and
machining the mounting lug to a final geometry.

14. The method of claim 13, further comprising:
forming a first of the tapered tubes with a D-shaped cross section comprising a curved sectional portion and a straight sectional portion, wherein the curved sectional portion forms a leading edge of the airfoil preform; and
forming a last of the tapered tubes with a generally triangular cross section comprising an apex that defines a trailing edge of the airfoil preform.

15. The method of claim 13, further comprising creating a metal grain orientation in a radial direction of the airfoil by forming the tubes by extruding a superalloy material.

16. The method of claim 15, further comprising forming the tubes using a tapered extrusion process such that a wall thickness of each tube tapers from relatively thicker at its base to relatively thinner at its tip.

17. A method of fabricating a turbine airfoil, comprising:
forming a plurality of tapered tubes, each tube comprising a smaller end and a larger end, and comprising walls that are thinner at the smaller end than at the larger end;
bonding the tapered tubes to each other in a parallel sequence that forms an airfoil comprising a leading edge, a trailing edge, side walls connected by internal ribs, a tip end of the airfoil, and a base end of the airfoil that is larger than the tip end;
bonding a tip cap over the tip end of the airfoil; and
forming a mounting lug on the base end of the airfoil,
wherein either the step of bonding of the tip cap or the step of forming of a mounting lug may be done prior to the other of these two steps.

18. A method of fabricating a turbine airfoil, comprising:
forming a plurality of tapered tubes, each tube comprising a smaller end and a larger end, and comprising walls that are thinner at the smaller end than at the larger end;
bonding the tapered tubes to each other in a parallel sequence that forms an airfoil comprising a leading edge, a trailing edge, side walls connected by internal ribs, a tip end of the airfoil, and a base end of the airfoil that is larger than the tip end;
forming the tubes without curvature for airfoil camber;
bonding the tubes to each other to form a flat preform of a non-cambered airfoil; and
hot-forming the preform into a cambered airfoil.

19. A method of fabricating a turbine airfoil, comprising:
forming a plurality of tapered tubes, each tube comprising a smaller end and a larger end, and comprising walls that are thinner at the smaller end than at the larger end;
bonding the tapered tubes to each other in a parallel sequence that forms an airfoil comprising a leading edge, a trailing edge, side walls connected by internal ribs, a tip end of the airfoil, and a base end of the airfoil that is larger than the tip end; and
forming a mounting lug by upset forging at least one pair of opposed laterally extending ridges on the airfoil base.

20. A turbine airfoil comprising:
a plurality of tapered tubes bonded together in a parallel sequence forming an airfoil, a first of the tubes forming a leading edge, a last of the tubes forming a trailing edge;
a tip cap bonded over a tip end of the airfoil; and
a mounting lug formed on a base end of the airfoil
wherein walls of the tubes form pressure and suction side walls of the airfoil and internal ribs there between;
wherein the tapered tubes comprise outer dimensions that taper from relatively smaller at the tip end of the airfoil to relatively larger at the base end of the airfoil, and the walls of the tubes taper from thinner at the tip end of the airfoil to thicker at the base end of the airfoil.

\* \* \* \* \*